US012749405B2

(12) United States Patent
Mok

(10) Patent No.: US 12,749,405 B2
(45) **Date of Patent: *Sep. 29, 2026**

(54) PLATOONING CONTROL APPARATUS AND METHOD

(71) Applicant: HYUNDAI MOBIS Co., Ltd., Seoul (KR)

(72) Inventor: Dong Hoon Mok, Yongin-so (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,959

(22) Filed: May 10, 2022

(65) Prior Publication Data

US 2022/0270492 A1 Aug. 25, 2022

Related U.S. Application Data

(63) Continuation of application No. 17/524,209, filed on Nov. 11, 2021, now Pat. No. 12,254,775, which is a (Continued)

(30) Foreign Application Priority Data

Sep. 27, 2017 (KR) ........................ 10-2017-0125517

(51) Int. Cl.
*G08G 1/00* (2006.01)
*B60W 10/04* (2006.01)
(Continued)

(52) U.S. Cl.
CPC ............. *G08G 1/22* (2013.01); *B60W 30/165* (2013.01); *G05D 1/0295* (2013.01); (Continued)

(58) Field of Classification Search
CPC ........................................................ G08G 1/22
See application file for complete search history.

(56) References Cited

U.S. PATENT DOCUMENTS 5,777,451 A 7/1998 Kobayashi et al.
6,032,097 A 2/2000 Iihoshi et al.
(Continued)

FOREIGN PATENT DOCUMENTS

CN 105702018 A * 3/2016
CN 106525058 A 3/2017
(Continued)

OTHER PUBLICATIONS

Google Translation of WO2018171712A1 (2017).*
(Continued)

*Primary Examiner* — Jean Paul Cass
(74) *Attorney, Agent, or Firm* — Morgan Lewis & Bockius LLP

(57) ABSTRACT

A platooning control apparatus may include: a navigation unit configured to guide an ego vehicle to a destination set by a driver; a driving module configured to drive the ego vehicle; and a control unit configured to primarily select platooning groups based on the destination set in the navigation unit, analyze platooning information of the primarily selected platooning groups, finally decide any one of the primarily selected platooning groups, and then control the driving module to join the finally decided platooning group.

8 Claims, 5 Drawing Sheets

Related U.S. Application Data continuation of application No. 16/139,675, filed on Sep. 24, 2018, now Pat. No. 11,200,808.

(51) Int. Cl.

| | |
|---|---|
| ***B60W 10/18*** | (2012.01) |
| ***B60W 10/20*** | (2006.01) |
| ***B60W 30/165*** | (2020.01) |
| ***B60W 50/00*** | (2006.01) |
| ***B60W 50/04*** | (2006.01) |
| ***G05D 1/00*** | (2024.01) |
| ***G05D 1/698*** | (2024.01) |
| ***G05D 111/30*** | (2024.01) |
| ***G08G 1/16*** | (2006.01) |

(52) U.S. Cl.

CPC ........... *G05D 1/6985* (2024.01); *G08G 1/163* (2013.01); *B60W 10/04* (2013.01); *B60W 10/18* (2013.01); *B60W 10/20* (2013.01); *B60W 2050/0075* (2013.01); *B60W 2050/046* (2013.01); *B60W 2420/403* (2013.01); *B60W 2420/408* (2024.01); *B60W 2556/65* (2020.02); *G05D 1/0278* (2013.01); *G05D 2111/30* (2024.01)

(56) References Cited

U.S. PATENT DOCUMENTS

| | | | | |
|---|---|---|---|---|
| 6,081,756 | A | 6/2000 | Mio et al. | |
| 6,128,559 | A | 10/2000 | Saitou et al. | |
| 6,619,212 | B1 | 9/2003 | Stephan et al. | |
| 7,860,639 | B2 | 12/2010 | Yang | |
| 8,442,735 | B2 | 5/2013 | Hrovat et al. | |
| 8,515,609 | B2 | 8/2013 | McAndrew et al. | |
| 8,682,511 | B2 | 3/2014 | Andreasson | |
| 8,744,661 | B2 | 6/2014 | Horn | |
| 8,774,981 | B2 | 7/2014 | Paz-Meidan et al. | |
| 8,775,060 | B2 | 7/2014 | Solyom et al. | |
| 8,907,814 | B2 | 12/2014 | Chen | |
| 8,914,225 | B2 | 12/2014 | Caskey et al. | |
| 9,182,764 | B1 | 11/2015 | Kolhouse et al. | |
| 10,254,764 | B2 * | 4/2019 | Laubinger | G08G 1/22 |
| 10,503,176 | B2 | 12/2019 | Lesher et al. | |
| 10,788,845 | B2 | 9/2020 | Sujan et al. | |
| 11,107,018 | B2 | 8/2021 | Light-Holets et al. | |
| 11,200,808 | B2 * | 12/2021 | Mok | G08G 1/22 |
| 11,468,774 | B2 * | 10/2022 | Jalali | G08G 1/167 |
| 11,496,871 | B2 * | 11/2022 | Yang | G08G 1/0116 |
| 11,520,354 | B1 | 12/2022 | Harris et al. | |
| 11,527,153 | B1 | 12/2022 | Shah et al. | |
| 11,546,753 | B1 | 1/2023 | Newman et al. | |
| 11,551,309 | B1 | 1/2023 | Slusar | |
| 11,558,731 | B2 | 1/2023 | Newman et al. | |
| 11,565,695 | B2 | 1/2023 | Slusar et al. | |
| 11,580,861 | B2 | 2/2023 | Bang et al. | |
| 11,586,222 | B2 | 2/2023 | Georgeson et al. | |
| 11,590,971 | B2 | 2/2023 | Hayakawa | |
| 11,592,827 | B1 | 2/2023 | Lam et al. | |
| 11,597,400 | B2 | 3/2023 | Tobe et al. | |
| 11,597,402 | B2 | 3/2023 | Gordon et al. | |
| 11,600,177 | B1 | 3/2023 | Konrardy et al. | |
| 2008/0249667 | A1 | 10/2008 | Horvitz et al. | |
| 2010/0256836 | A1 | 10/2010 | Mudalige | |
| 2010/0256852 | A1 * | 10/2010 | Mudalige | G08G 1/163 701/24 |
| 2012/0046816 | A1 | 2/2012 | Mullen | |
| 2013/0301584 | A1 | 11/2013 | Addepalli et al. | |
| 2014/0316865 | A1 * | 10/2014 | Okamoto | G05D 1/0293 705/14.1 |
| 2015/0100192 | A1 | 4/2015 | Lee et al. | |
| 2015/0154871 | A1 | 6/2015 | Rothoff et al. | |
| 2016/0026187 | A1 | 1/2016 | Alam et al. | |
| 2016/0171894 | A1 | 6/2016 | Harvey | |
| 2017/0270785 | A1 * | 9/2017 | Umehara | G08G 1/08 |
| 2017/0293296 | A1 * | 10/2017 | Stenneth | G06Q 10/06315 |
| 2017/0349176 | A1 * | 12/2017 | Alden | B60W 30/16 |
| 2018/0082591 | A1 * | 3/2018 | Pandy | G08G 1/22 |
| 2018/0188725 | A1 * | 7/2018 | Cremona | G01S 19/13 |
| 2018/0188745 | A1 | 7/2018 | Pilkington | |
| 2018/0188746 | A1 * | 7/2018 | Lesher | B60W 40/08 |
| 2018/0211546 | A1 * | 7/2018 | Smartt | G06F 21/44 |
| 2019/0012919 | A1 | 1/2019 | Brandriff et al. | |
| 2019/0171225 | A1 * | 6/2019 | Switkes | B60W 30/165 |
| 2020/0241541 | A1 | 7/2020 | McCawley et al. | |
| 2020/0342760 | A1 | 10/2020 | Vassilovski et al. | |
| 2021/0264794 | A1 | 8/2021 | Merwaday et al. | |
| 2022/0068122 | A1 | 3/2022 | Ucar et al. | |
| 2022/0261010 | A1 * | 8/2022 | Ji | G05D 1/0291 |
| 2022/0270492 | A1 | 8/2022 | Mok | |
| 2022/0270493 | A1 | 8/2022 | Mok | |
| 2022/0351625 | A1 * | 11/2022 | Qi | B60W 30/165 |
| 2022/0415181 | A1 * | 12/2022 | Wang | G08G 1/096775 |

FOREIGN PATENT DOCUMENTS

| | | | | |
|---|---|---|---|---|
| EP | 3734567 B1 * | 4/2022 | | B60W 40/08 |
| JP | 3633707 B2 | 3/2005 | | |
| KR | 10-0957137 B1 | 5/2010 | | |
| KR | 10-2014-0068591 A | 6/2014 | | |
| KR | 10-1463250 B1 | 11/2014 | | |
| KR | 10-2017-0016177 A | 2/2017 | | |
| WO | WO-WO2017200433 A1 * | 5/2016 | | B60W 10/18 |
| WO | WO-2021106195 A1 * | 6/2021 | | |
| WO | WO-2021106205 A1 * | 6/2021 | | |
| WO | WO-2021127890 A1 * | 7/2021 | | B60W 10/18 |

OTHER PUBLICATIONS

Googlle Translation of CN105702018A (Mar. 14, 2016).*
Google Translation of WO2017200433A1 (2016).*
Google Machine translation of EP3734567B1 (2016).*
Office Action issued in corresponding U.S. Appl. No. 17/524,209 dated Mar. 13, 2023.
Office Action dated Mar. 17, 2021, issued in Korean Patent Application No. 10-2017-0125517.
Notice of Allowance issued in corresponding U.S. Appl. No. 16/139,675 dated Aug. 11, 2021.
Office Action issued in corresponding U.S. Appl. No. 16/139,675 dated Apr. 14, 2021.
Final Office Action issued in corresponding U.S. Appl. No. 16/139,675 dated Nov. 13, 2020.
Office Action issued in corresponding U.S. Appl. No. 16/139,675 dated May 28, 2020.
Office Action issued Sep. 14, 2023 for counterpart U.S. Appl. No. 17/524,209.
U.S. Non-Final Office Action dated Apr. 2, 2024 issued in U.S. Appl. No. 17/740,963.
U.S. Non-Final Office Action dated Sep. 28, 2024 issued in U.S. Appl. No. 17/740,963.
U.S. Final Office Action dated Aug. 28, 2025 issued in U.S. Appl. No. 17/741,005.
Office Action issued in corresponding U.S. Appl. No. 17/740,963 dated Dec. 9, 2025.

* cited by examiner

PLATOONING CONTROL APPARATUS AND METHOD

CROSS-REFERENCES TO RELATED APPLICATIONS

This application is a continuation application of U.S. patent application Ser. No. 17/524,209 filed Nov. 11, 2021, which is a continuation application of U.S. patent application Ser. No. 16/139,675 filed on Sep. 24, 2018, which claims the benefit to Korean Patent Application No. 10-2017-0125517, filed on Sep. 27, 2017, the entire contents of each are hereby incorporated by reference.

BACKGROUND

Field

Exemplary embodiments relate to a platooning control apparatus and method, and more particularly, to a platooning control apparatus and method which can control an ego vehicle to join or leave a platooning group.

In general, platooning means that a group of vehicles drive on a road while sharing driving information and considering an external environment.

One group includes a leader vehicle and follower vehicles. The leader vehicle is a vehicle leading the group at the head of the group, and the follower vehicles are vehicles following the leader vehicle.

Discussion of the Background

The following vehicles of the group may continuously follow the leader vehicle, using driving information of the leader vehicle, transmitted through vehicle-to-vehicle communication. The driving information may include GPS coordinates, velocity, route, direction and brake stepping information. Therefore, drivers of the follower vehicles can freely conduct various behaviors other than driving. For example, the drivers can operate their smart phones or sleep in the vehicles. The platooning technology can increase a driver's convenience, and raise the efficiency of transportation.

The related art of the present invention is disclosed in Korean Patent Registration No. 10-0957137 registered on May 3, 2010 and entitled "Platooning control system and method".

In the conventional platooning control system, however, a group of vehicles must drive together from the beginning of platooning, and another vehicle has difficulties in joining the group in the middle of the platooning. In particular, when the starting point of the vehicle is different from the starting point of the platooning vehicles, the vehicle has difficulties in determining at which point the vehicle should join the group, and the platooning of the vehicles is considered only in the autonomous mode.

Furthermore, the conventional platooning control system has a limitation in that all of the vehicles within the group must drive in a line. For example, although an empty lane is present on a road, the following vehicles of the group must follow the leader vehicle only in the same lane as the leader vehicle. When another vehicle cuts in the middle of the group, the following vehicle at the rear of the corresponding vehicle may not normally follow the leader vehicle.

The above information disclosed in this Background section is only for enhancement of understanding of the background of the invention and, therefore, it may contain information that does not constitute prior art.

SUMMARY

Exemplary embodiments of the present invention are directed to a platooning control apparatus and method which can select a platooning group that is the most suitable for the driving state of an ego vehicle, among a plurality of platooning groups, and control the ego vehicle to join or leave the corresponding platooning group.

In one embodiment, a platooning control apparatus may include: a navigation unit configured to guide an ego vehicle to a destination set by a driver; a driving module configured to drive the ego vehicle; and a control unit configured to primarily select platooning groups based on the destination set in the navigation unit, analyze platooning information of the primarily selected platooning groups, finally decide any one of the primarily selected platooning groups, and then control the driving module to join the finally decided platooning group.

The primarily selected platooning groups may include a platooning group having the same destination as the destination set in the navigation unit.

The primarily selected platooning groups may include a platooning group of which the destination is the closest to the destination set in the navigation unit.

The control unit may finally decide the platooning group according to one or more of vehicle information and an accumulated platooning distance of a leader vehicle within each of the primarily selected platooning groups.

The control unit may output vehicle information and an accumulated platooning distance of a leader vehicle within each of the primarily selected platooning groups through a user interface unit, and finally decide the platooning group according to a driver's selection.

The control unit may decide a joining point where the ego vehicle will join the platooning group, according to the location of the ego vehicle and a platooning trajectory of the platooning group.

When a plurality of joining points are found, the control unit may decide the joining point according to one or more of a distance to each of the joining points from the location of the ego vehicle, traffic condition information of the joining point, an accident risk of the joining point and a fee to the joining point.

The control unit may apply weights to the distance to each of the joining points from the location of the ego vehicle, the traffic condition information of the joining point, the accident risk of the joining point and the fee to the joining point, in order to decide the joining point.

The control unit may output one or more of the distance to each of the joining points from the location of the ego vehicle, the traffic condition information of the joining point, the accident risk of the joining point and the fee to the joining point through a user interface unit, and finally decide the joining point according to the driver's selection.

When the ego vehicle is an autonomous vehicle, the control unit may control the ego vehicle to autonomously join the tail of the leader vehicle within the platooning group.

In another embodiment, a platooning control method may include: primarily selecting, by a control unit, platooning groups based on a destination set in a navigation unit; analyzing, by the control unit, platooning information of the primarily selected platooning groups, and finally deciding any one of the primarily selected platooning groups; and controlling, by the control unit, a driving module to drive an ego vehicle, such that the ego vehicle joins the finally decided platooning group.

The primarily selected platooning groups may include a platooning group having the same destination as the destination set in the navigation unit.

The primarily selected platooning groups may include a platooning group of which the destination is the closest to the destination set in the navigation unit.

In the deciding of any one of the primarily selected platooning groups, the control unit may finally decide the platooning group according to one or more of vehicle information and an accumulated platooning distance of a leader vehicle within each of the primarily selected platooning groups.

In the deciding of any one of the primarily selected platooning groups, the control unit may output one or more of vehicle information and an accumulated platooning distance of a leader vehicle within each of the primarily selected platooning groups through a user interface unit, and finally decide the platooning group according to a driver's selection.

In the controlling of the driving module to drive the ego vehicle, the control unit may decide a joining point to join the platooning group, according to the location of the ego vehicle and a platooning trajectory of the platooning group.

When a plurality of joining points are found, the control unit may decide the joining point according to one or more of a distance to each of the joining points from the location of the ego vehicle, traffic condition information of the joining point, an accident risk of the joining point and a fee to the joining point.

The control unit may apply weights to the distance to each of the joining points from the location of the ego vehicle, the traffic condition information of the joining point, the accident risk of the joining point and the fee to the joining point, in order to decide the joining point.

The control unit may output one or more of the distance to each of the joining points from the location of the ego vehicle, the traffic condition information of the joining point, the accident risk of the joining point and the fee to the joining point through a user interface unit, and finally decide the joining point according to the driver's selection.

In the controlling of the driving module to drive the ego vehicle, the control unit may control the ego vehicle to autonomously join the tail of the leader vehicle within the platooning group, when the vehicle is an autonomous vehicle.

The platooning control method may further include informing, by the control unit, the driver of a leaving point through the user interface unit before the ego vehicle arrives at the leaving point.

The leaving point may be set according to an accident risk.

It is to be understood that both the foregoing general description and the following detailed description are exemplary and explanatory and are intended to provide further explanation of the invention as claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAIL DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Hereafter, a platooning control apparatus and method in accordance with an embodiment of the present invention will be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
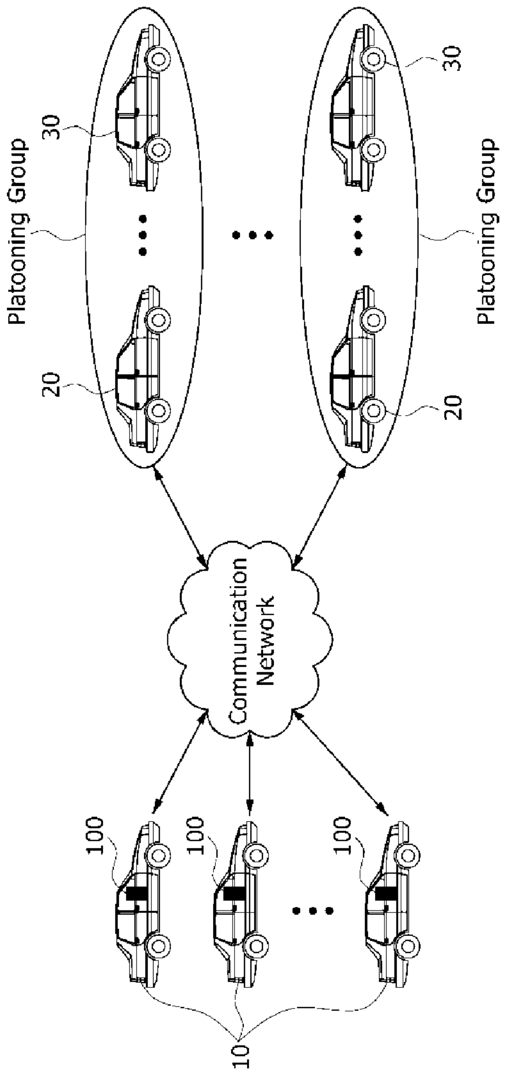
FIG. 1 is a conceptual view illustrating an operation of a platooning control apparatus in accordance with an embodiment of the present invention.

FIG. 1 is a conceptual view illustrating an operation of a platooning control apparatus in accordance with an embodiment of the present invention.

Referring to FIG. 1, the platooning control apparatus 100 in accordance with the embodiment of the present invention may be installed in an ego vehicle 10, and connected to a leader vehicle 20 of a platooning group through a communication network. As illustrated in FIG. 1, a plurality of platooning groups may be present. Thus, the platooning control apparatus 100 may transmit/receive various pieces of information to/from one or more of the leader vehicles 20 of the respective platooning groups.

The platooning control apparatus 100 may be connected to a server which controls and manages platooning through the communication network, and transmit/receive various pieces of information to/from the server. Such a server may include various devices or systems and databases, which manage and engage in the platooning. Examples of the server may include a route guidance server for guiding the leader vehicle 20 and follower vehicles 30 in the platooning group to their destination and a fee management server for calculating and managing a platooning-related fee.

The information which the platooning control apparatus 100 transmits/receives to/from the leader vehicle 20 or the server will be described later.

Figure 2:
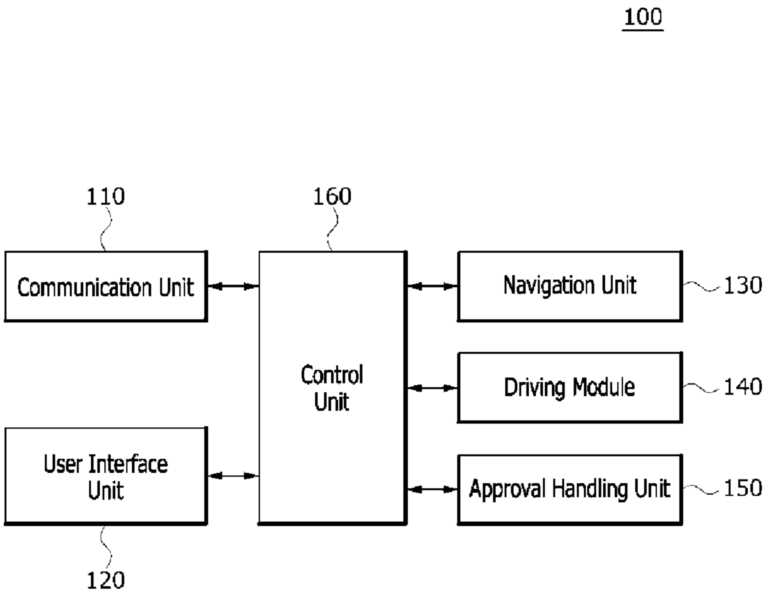
FIG. 2 is a block diagram illustrating the platooning control apparatus in accordance with the embodiment of the present invention.
Figure 3:
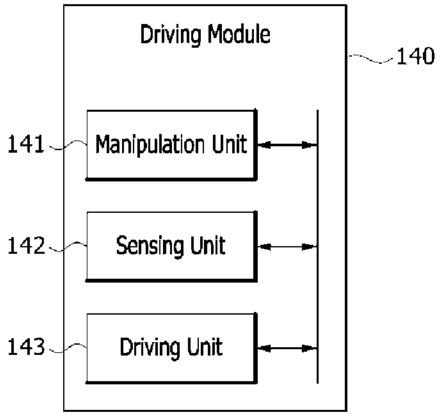
FIG. 3 is a block diagram illustrating a driving module in accordance with the embodiment of the present invention.

FIG. 2 is a block diagram illustrating the platooning control apparatus in accordance with the embodiment of the present invention, and FIG. 3 is a block diagram illustrating a driving module in accordance with the embodiment of the present invention.

Referring to FIG. 2, the platooning control apparatus 100 in accordance with the embodiment of the present invention may include a communication unit 110, a user interface unit 120, a navigation unit 130, a driving module 140, an approval handling unit 150 and a control unit 160.

The communication unit 110 may transmit/receive information to/from the leader vehicle 20 or the server through the communication network. The communication unit 110 may communicate with the leader vehicle 20 or the server through one or more of WLAN (Wireless LAN), Wi-Fi (Wireless-Fidelity), Wi-Fi (Wireless Fidelity) Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution) and LTE-A (Long Term Evolution-Advanced).

The communication unit 110 may perform short range communication with the leader vehicle 20. That is, when the ego vehicle 10 joins the platooning group, the ego vehicle 10 may be positioned at a short distance from the leader vehicle 20. Therefore, the communication unit 110 may transmit/receive various pieces of information to/from the leader vehicle 20 within the platooning group through short range communication, such that the ego vehicle 10 can participate in the platooning.

In this case, the communication unit 110 may communicate with the leader vehicle 20 through Bluetooth, RFID (Radio Frequency Identification), IrDA (Infrared Data Association), UWB (Ultra Wideband), ZigBee, NFC (Near Field Communication), Wi-Fi (Wireless-Fidelity), Wi-Fi Direct or Wireless USB (Wireless Universal Serial Bus).

The communication unit 110 may perform short range communication with the mobile terminal of a driver, receive a setting command of the driver, and transmit the setting command to the control unit 160.

The user interface unit 120 may provide a user interface to the driver.

The user interface unit 120 may receive information from the driver, and input the information to the control unit 160 or output an operation result.

For example, the user interface unit 120 may receive a destination from the driver or output a route to the destination based on an operation of the navigation unit 130. In this case, the user interface unit 120 may provide information on a point of interest (POI) set in the navigation unit 130, or output various menus of the navigation system.

The user interface unit 120 may output vehicle information of the leader vehicles 20 and accumulated platooning distances of the leader vehicles 20 in platooning groups which are primarily selected according to the destination, and receive a driver' selection to finally decide a platooning group. Here, the primarily selected platooning groups and the finally selected platooning group will be described.

The user interface unit 120 may display information on joining points where the ego vehicle 10 can join the platooning group, receive a joining point selected by the driver, and input the joining point to the control unit 160. The information on the joining point may include the location information of the joining point, the distance from the location of the ego vehicle 10 to the joining point, the traffic condition information of the joining point, the traffic accident risk of the joining point and the fee to the joining point. The information on the joining point will be described later.

The user interface unit 120 may guide a leaving point before the ego vehicle 10 arrives at the destination after joining the platooning group.

In addition, the user interface unit 120 may provide a platooning-related user interface to the driver while the ego vehicle 10 joins and leaves the platooning group. For example, the user interface unit 120 may provide various pieces of information to the driver, and receive various control commands from the driver.

The navigation unit 130 may display the location of the ego vehicle 10 on the map, and guide a route to the destination. Furthermore, the navigation unit 130 may sense the location of the ego vehicle 10, and input the sensed location to the control unit 160.

The driving module 140 may drive the ego vehicle 10 based on a driver's manipulation or an autonomous function.

Referring to FIG. 3, the driving module 140 may include a manipulation unit 141, a sensing unit 142 and a driving unit 143. The manipulation unit 141 may receive a manipulation of the driver, the sensing unit 142 may sense the driving state and surrounding situation of the ego vehicle 10, and the driving unit 143 may drive the ego vehicle 10.

The manipulation unit 141 may receive the driver's manipulation to drive the ego vehicle 10.

The manipulation unit 141 may include a steering wheel which receives a steering command from the driver to steer the ego vehicle 10, a gear input unit which receives a gear manipulation of the ego vehicle 10, an accelerator pedal which receives an acceleration command from the driver, and a brake pedal which receives a deceleration command from the driver.

The sensing unit 142 may sense the driving state and surrounding situation of the ego vehicle 10. Examples of the sensing unit 142 for sensing the driving state of the ego vehicle 10 may include a collision sensor, a steering sensor, a velocity sensor, a gradient sensor, a weight sensor, a yaw sensor, a gyro sensor, a position module sensor, a vehicle forward/reverse sensor, a battery sensor, a fuel sensor, a tire sensor, a steering sensor by rotation of a steering wheel, an internal temperature sensor, an internal humidity sensor and the like. The sensing unit 142 may acquire vehicle collision information, vehicle direction information, vehicle angle information, vehicle velocity information, vehicle acceleration information, vehicle tilt information, vehicle forward/reverse information, battery information, fuel information, tire information, vehicle lamp information, internal temperature information, internal humidity information, steering wheel rotation angle and the like, through the sensors.

Examples of the sensing unit 142 for sensing the surrounding situation of the ego vehicle 10 may include one or more of a camera, an ultrasonic sensor, an infrared light sensor, a radar and a lidar. The sensing unit 142 may acquire surrounding situation information related to various objects or obstacles positioned around the ego vehicle 10 in operation through the sensors. For example, the surrounding situation information may include the locations of the obstacles, the number of obstacles, the distances to the obstacles, the types of the obstacles, neighboring vehicles, surrounding facilities, traffic signs and the like.

In particular, the camera may film areas around the ego vehicle 10, and acquire information on one or more of a traffic light, traffic sign, pedestrian, neighboring vehicles and a road condition.

The driving unit 143 may control operations of various devices in the vehicle. The driving unit 143 may include a driving part such as an engine or transmission to drive the ego vehicle 10, a steering part to steer the ego vehicle 10, a brake part to stop the ego vehicle 10, and a lamp driving part to guide the driving state or driving direction of the ego vehicle 10.

The driving module 140 is only an example, and may further include various systems and devices in addition to the manipulation unit 141, the sensing unit 142 and the driving unit 143, as long as they are related to the driving of the ego vehicle 10.

The approval handling unit 150 may process a fee required for the ego vehicle 10 to join the platooning group, and request the leader vehicle 20 of the platooning group to approve the joining of the ego vehicle 10.

The control unit 160 may control the communication unit 110 to request the destinations of the platooning groups from the server or the leader vehicles 20 of the platooning groups through the communication network.

When the destinations of the platooning groups are received through the communication network, the control unit 160 may compare the destination of the ego vehicle 10, sensed through the navigation unit 130, to the destinations of the platooning groups, determine whether there is a platooning group having the same destination as the destination of the ego vehicle 10, and primarily select the corresponding platooning group according to the determination result.

On the other hand, wherein the determination result indicates that there is no platooning group having the same destination as the destination of the ego vehicle 10, the control unit 160 may primarily select a platooning group of which the destination is the closest to the destination of the ego vehicle 10.

In this case, a plurality of platooning groups may be primarily selected.

When the platooning groups are primarily selected based on the destination of the ego vehicle 10 and the destinations of the platooning groups, the control unit 160 may request platooning information on the leader vehicles 20 of the primarily selected platooning groups from the server or the leader vehicles 20 of the corresponding platooning groups through the communication unit 110.

The platooning information may include the vehicle information of the leader vehicles 20 of the platooning groups and the accumulated platooning distances of the leader vehicles 20, and serve as basic information for securing the reliability of the leader vehicles 20 of the corresponding platooning groups.

The vehicle information of the leader vehicle 20 may include a vehicle model, sensor model, camera model, the number of sensors, the number of cameras, main mounted functions and the like.

The accumulated platooning distance of the leader vehicle 20 may correspond to the total platooning distance that the leader vehicle 20 has driven so far.

When the platooning information is received, the control unit 160 may analyze the platooning information, and finally decide a platooning group.

At this time, when one platooning group is primarily selected based on the destination of the ego vehicle 10 and the destinations of the platooning groups, the control unit 160 may output the platooning information of the corresponding platooning group through the user interface unit 120, and set the platooning group to the final platooning group which the ego vehicle 10 will join.

In this case, the driver may recognize the platooning information, and agree with the decision of the control unit 160 for the final platooning group, or give up joining the corresponding platooning group.

On the other hand, when a plurality of platooning groups are primarily selected based on the destination of the ego vehicle 10 and the destinations of the platooning groups, the control unit 160 may output the platooning information of the respective platooning groups through the user interface unit 120, analyze the platooning information of the platooning groups, and decide any one platooning group based on the analysis result.

In this case, the driver may recognize the platooning information of the respective platooning groups, and agree with the decision of the control unit 160 for the final platooning group or arbitrarily select any one of the other platooning groups. In this way, the control unit 160 may finally decide the platooning group according to the driver's selection.

When the platooning group is decided as described above, the control unit 160 may decide a joining point where the ego vehicle will join the corresponding platooning group, based on the location of the ego vehicle 10.

For this operation, the control unit 160 may detect the location of the ego vehicle 10 through the navigation unit 130, receive a platooning driving trajectory from the leader vehicle 20 of the corresponding platooning group, and decide a joining point where the ego vehicle will join the platooning group, according to the location of the ego vehicle 10 and the platooning driving trajectory of the platooning group.

In this case, a plurality of joining points may be found depending on the location of the ego vehicle 10 and the platooning driving trajectory of the platooning group.

When the plurality of joining points are found, the control unit 160 may decide a joining point according to one or more of distances to the joining points from the location of the ego vehicle 10, traffic condition information of the joining points, accident risks of the joining points, and fees to the joining points.

That is, when the plurality of joining points are found, the control unit 160 may control the navigation unit 130 to detect the distances to the joining points from the location of the ego vehicle 10, the traffic condition information of the joining points, the accident risks of the joining points, and the fees to the joining points, and finally decide a joining point according to one or more of them.

In this case, the control unit 160 may apply weights to the distances to the joining points from the location of the ego vehicle 10, the traffic condition information of the joining points, the accident risks of the joining points, and the fees to the joining points, and decide any one joining point according to the weights of the joining points.

Then, the control unit 160 may output the distance to the joining point from the location of the ego vehicle 10, the traffic condition information of the joining point, the accident risk of the joining point, and the fee to the joining point through the user interface unit 120, and output the joining point.

At this time, the driver may agree with the decision of the control unit 160 for the joining point. However, the driver may not agree with the decision, but directly decide a joining point by referring to the distances to the joining points from the location of the ego vehicle 10, the traffic condition information of the joining points, the accident risks of the joining points and the fees to the joining points. In this case, the control unit 160 may finally decide the joining point according to the driver's selection.

The weights applied to the joining points from the location of the ego vehicle 10, the traffic condition information of the joining points, the accident risks of the joining points, and the fees to the joining points may be previously set according to the preference of the driver.

When the joining point is decided, the control unit 160 may control the driving module 140 to drive the ego vehicle 10 to the joining point.

In this case, the driving module 140 may drive the ego vehicle 10 to the joining point according to the user's manipulation. When the ego vehicle 10 is an autonomous vehicle with an autonomous driving function, the ego vehicle 10 may autonomously drive to the joining point.

When the ego vehicle 10 reaches a location within a range in which the ego vehicle 10 can perform short range communication with the leader vehicle 20 of the platooning group after arriving at the joining point, the control unit 160 may control the approval handling unit 150 to pay for the fee to the platooning, and request the leader vehicle 20 of the corresponding platooning group to approve the joining of the platooning.

Then, the ego vehicle 10 may autonomously join the tail of the corresponding platooning group when the ego vehicle 10 is an autonomous vehicle, or the control unit 160 may control the ego vehicle 10 to join a location within the platooning group according to the driver's selection.

On the other hand, when the ego vehicle 10 is not an autonomous vehicle, the control unit 160 may control the user interface unit 120 to select any one of a manual joining method and an automatic joining method.

At this time, when the manual joining method is selected, the driving module 140 may be driven to join the platooning group according to the driver's intention. Then, the control unit 160 may turn on a driving support function, for example, SCC (Smart cruise control), LKA (Lane Keeping Assistance) or ACC (Auto cruise control).

On the other hand, when the automatic joining method is selected, the control unit 160 may control the driving module 140 to turn on the driving support function, and drive a semi-autonomous function to join the tail of the platooning group.

When the ego vehicle 10 joins the platooning group, the control unit 160 may detect a leaving point.

The leaving point may indicate a point where the ego vehicle 10 will leave the platooning group. When a plurality of leaving points are detected depending on a geographic location or road structure, the control unit 160 may control the navigation unit 130 to select a leaving point which has a relatively low accident risk, among the leaving points.

The control unit 160 may control the navigation unit 130 to check whether the ego vehicle 10 has reached a point within a preset distance from the leaving point or an estimated time of arrival at the leaving point falls within a preset time.

In this case, when the ego vehicle 10 reaches a point within the preset distance from the leaving point or the estimated time of arrival at the leaving point falls within the preset time, the control unit 160 may control the user interface unit 120 to inform the driver that the ego vehicle 10 will soon arrive at the leaving point. Then, the ego vehicle 10 can leave the platooning group at the leaving point.

When the ego vehicle 10 joins or leave the platooning group during the above-described process, the control unit 160 may restrict the joining or leaving of the ego vehicle 10 in the case where an over-speeding vehicle or obstacle is present.

Hereafter, a platooning control method in accordance with an embodiment of the present invention will be described in detail with reference to FIGS. 4 and 5.

Figure 4:
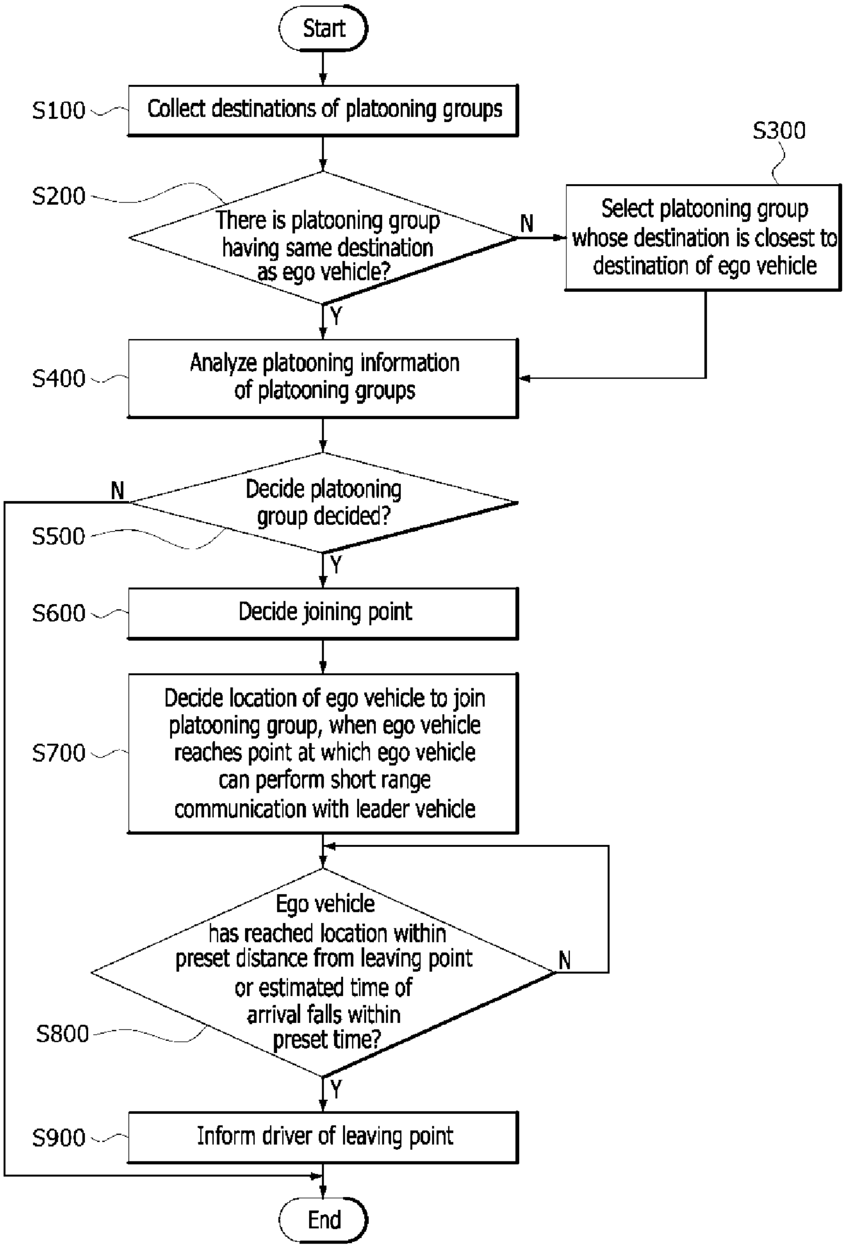
FIG. 4 is a flowchart illustrating a platooning control method in accordance with an embodiment of the present invention.
Figure 5:
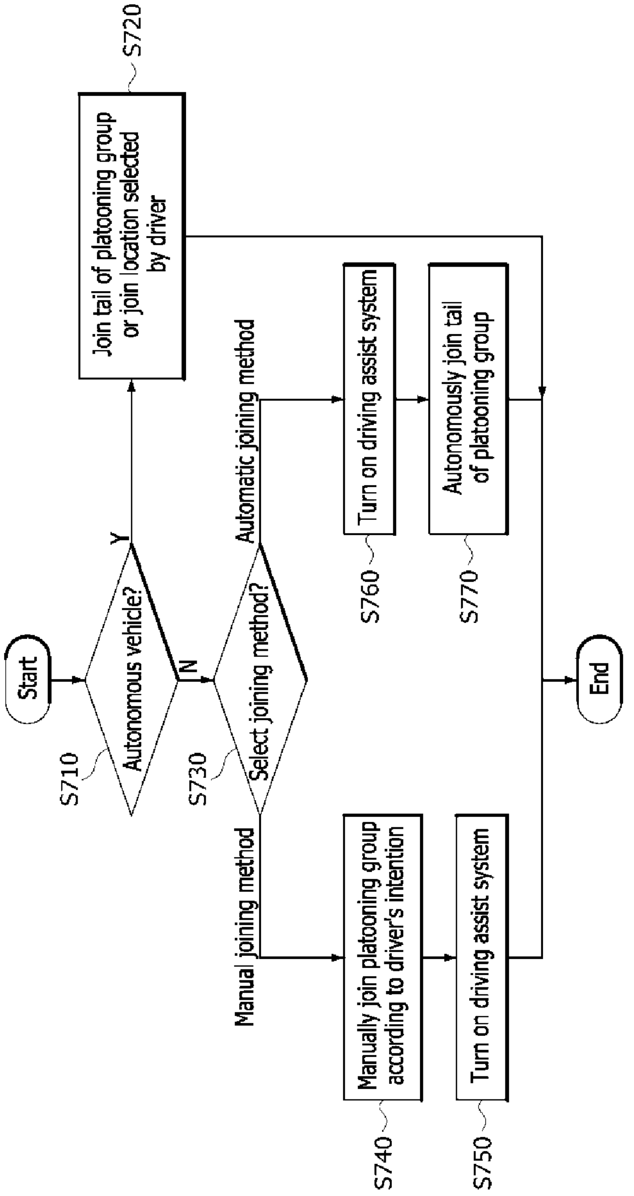
FIG. 5 is a flowchart illustrating a platooning group joining method in accordance with the embodiment of the present invention.

FIG. 4 is a flowchart illustrating a platooning control method in accordance with an embodiment of the present invention, and FIG. 5 is a flowchart illustrating a platooning group joining method in accordance with the embodiment of the present invention.

Referring to FIG. 4, the control unit 160 may collect the destinations of platooning groups by requesting the destinations of the platooning groups from the server or the leader vehicles 20 of the platooning groups through the communication unit 110, at step S100.

When the destinations of the platooning groups are collected, the control unit 160 may compare the destination of the ego vehicle 10, set in the navigation unit 130, to the destinations of the platooning groups, and determine whether there is a platooning group having the same destination as the destination of the ego vehicle 10, at step S200, in order to primarily select platooning groups having the same destination as the destination of the ego vehicle 10.

On the other hand, when the determination result of step S200 indicates that there is no platooning group having the same destination as the destination of the ego vehicle 10, the control unit 160 may primarily select platooning groups of which the destinations are relatively close to the destination of the ego vehicle 10, at step S300.

When the platooning groups are primarily selected as described above, the control unit 160 may request platooning information of the leader vehicles 20 of the primarily selected platooning groups from the server or the corresponding platooning groups through the communication unit 110. The platooning information may include vehicle information of the leader vehicles 20 of the platooning groups and the accumulated platooning distances of the leader vehicles 20.

When the platooning information is received, the control unit 160 may analyze the platooning information, and finally decide a platooning group, at steps S400 and S500.

For example, when one platooning group is primarily selected based on the destination of the ego vehicle 10 and the destinations of the platooning groups, the control unit 160 may output the platooning information of the corresponding platooning group through the user interface unit 120, and set the platooning group to the final platooning group which the ego vehicle 10 will join. In this case, the driver may recognize the platooning information, and finally decide whether to join the corresponding platooning group.

On the other hand, when a plurality of platooning groups are primarily selected based on the destination of the ego vehicle 10 and the destinations of the platooning groups, the control unit 160 may output the platooning information of the platooning groups through the user interface unit 120, analyze the platooning information of the platooning groups, and decide any one platooning group based on the analysis result.

In this case, the driver may recognize the platooning information of the platooning groups, and agree with the decision of the control unit 160 for the platooning group or arbitrarily select any one of the other platooning groups. Therefore, the control unit 160 may finally decide the platooning group according to the driver's selection.

When the platooning group is decided as described above, the control unit 160 may decide a joining point where the ego vehicle 10 will join the corresponding platooning group, based on the location of the ego vehicle 10, at step S600.

That is, the control unit 160 may detect the location of the ego vehicle 10 through the navigation unit 130, receive a platooning driving trajectory from the leader vehicle 20 of the corresponding platooning group, and decide a joining point where the ego vehicle will join the platooning group, according to the location of the ego vehicle 10 and the platooning driving trajectory of the platooning group.

At this time, when a plurality of joining points are decided, the control unit 160 may decide a joining point according to one or more of distances to the joining points from the location of the ego vehicle 10, traffic condition information of the joining points, accident risks of the joining points and fees to the joining points. Then, the control unit 160 may finally decide a joining point according to weights applied to the distances to the joining points from the location of the ego vehicle 10, the traffic condition information of the joining points, the accident risks of the joining points and the fees to the joining points.

Furthermore, the control unit 160 may output the distances to the joining points from the location of the ego vehicle 10, the traffic condition information of the joining points, the accident risks of the joining points and the fees to the joining points through the user interface unit 120, and output the joining points. At this time, the control unit 160 may finally decide a joining point according to the driver's selection, instead of the joining point decided based on the weights.

When the joining point is decided, the control unit 160 may control the driving module 140 to drive the ego vehicle 10 to the joining point. When the ego vehicle 10 reaches a location within a range in which the ego vehicle 10 can perform short range communication with the leader vehicle 20 of the platooning group after arriving at the joining point, the control unit 160 may control the approval handling unit 150 to pay for the fee to the platooning, and request the leader vehicle 20 of the corresponding platooning group to approve the joining of the platooning group.

The control unit 160 may decide the location of the ego vehicle 10 within the platooning group, such that the ego vehicle 10 can join the platooning group at the corresponding location, at step S700. This process will be described with reference to FIG. 5.

First, the control unit 160 may determine whether the ego vehicle 10 is an autonomous vehicle, at step S710. When the determination of step S710 indicates that the ego vehicle 10 is an autonomous vehicle, the ego vehicle 10 may autonomously join the tail of the corresponding platooning group, or the control unit 160 may control the ego vehicle 10 to join the platooning group at a location selected by the driver, at step S720.

On the other hand, when the determination of step S710 indicates that the ego vehicle 10 is not an autonomous vehicle, the control unit 160 may control the user interface unit 120 to select any one of the manual joining method and the automatic joining method at step S730.

At this time, when the manual joining method is selected, the control unit 160 may drive the driving module 140 to join the platooning group at the location according to the driver's intention at step S740, and turn on the driving assist function at step S750.

On the other hand, when the automatic joining method is selected, the control unit 160 may control the driving module 140 to turn on the driving assist function at step S760, and drive the semi-autonomous function to join the tail of the platooning group at step S770.

When the ego vehicle 10 joins the platooning group as described above, the control unit 160 may detect a point where the ego vehicle 10 will leave the platooning group, and determine whether the ego vehicle 10 has reached a location within a preset distance from the leaving point or an estimated time of arrival at the leaving time falls within a preset time, at step S800.

When the determination result indicates that the ego vehicle 10 has reached a location within the preset distance from the leaving point or the estimated time of arrival at the leaving point falls within the preset time, the control unit 160 may control the user interface unit 120 to inform the driver that the ego vehicle 10 will soon arrive at the leaving point, at step S900. Then, the ego vehicle 10 can leave the platooning group at the leaving point.

As such, the platooning control apparatus and method in accordance with the embodiments of the present invention can select the platooning group which is most suitable for the driving state of the ego vehicle 10, among the plurality of platooning groups, and control the ego vehicle 10 to join or leave the corresponding platooning group.

Furthermore, the platooning control apparatus and method can propose various options to the driver using a navigation system, smart phone or V2X when platooning is selected, and consider various driving situations when the ego vehicle joins or leaves the platooning group, thereby securing the safety and convenience of the ego vehicle 10.

Furthermore, the platooning control apparatus and method can control the ego vehicle 10 to follow the leader vehicle 20 of the platooning group in a different lane, and thus minimize the distance between the ego vehicle 10 and the leader vehicle 20. Therefore, the efficiency of the road can be improved while the following performance for the leader vehicle is improved.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A method for controlling a potential following vehicle in a platooning group, the method comprising:

generating a platooning group including a leading vehicle and at least one following vehicle, wherein the leading vehicle is a first vehicle in the platooning group, and the at least one following vehicle is one or more vehicle operating in the platooning group behind the leading vehicle and connected using a V2V (vehicle-to-vehicle) communication;

transmitting, in the potential following vehicle, a join request to the leading vehicle included in the platooning group after generating the platooning group, prior to transmitting the join request;

transmitting, in the leading vehicle included in the platooning group, vehicle information about the leading vehicle to the potential following vehicle, wherein the potential following vehicle joins as a new last following vehicle in the platooning group regardless of when the join request is transmitted;

generating a new platooning group including the leading vehicle, the at least one following vehicle and the potential following vehicle, wherein the potential following vehicle is a last following vehicle in the new platooning group based on platoon management information including information related to the vehicle in the platooning group and information related to a distance for the platooning group; and beginning a cruising operation after a join process is completed, wherein the join process fails based on a planned route of the leading vehicle, wherein the vehicle information of the leader vehicle includes sensor model or camera model.

2. The method of claim 1, wherein the vehicle information further comprises vehicle type information of the leading vehicle.

3. The method of claim 2, wherein the vehicle information further comprises information about main mounted functions.

4. The method of claim 1, wherein the cruising operation includes a SCC (Smart cruise control), a LKA (Lane Keeping Assistance) or an ACC (Adaptive cruise control).

5. The method of claim 4, wherein the potential following vehicle drives manually or automatically.

6. The method of claim 5, wherein the leading vehicle and the at least one following vehicle are controlled in a platoon based on data obtained from at least one sensor.

7. The method of claim 6, wherein the at least one sensor comprises a radar, a lidar or a camera.

8. The method of claim 7, wherein the vehicle platooning system comprises a server for performing a route management, a charge process or a payment process.

* * * * *